July 6, 1948.　　　　F. C. WALLACE　　　　2,444,480
ELECTRIC MOTOR SYNCHRONIZING SYSTEM
Filed Nov. 21, 1945　　　　　　　　　　　　　　2 Sheets-Sheet 1
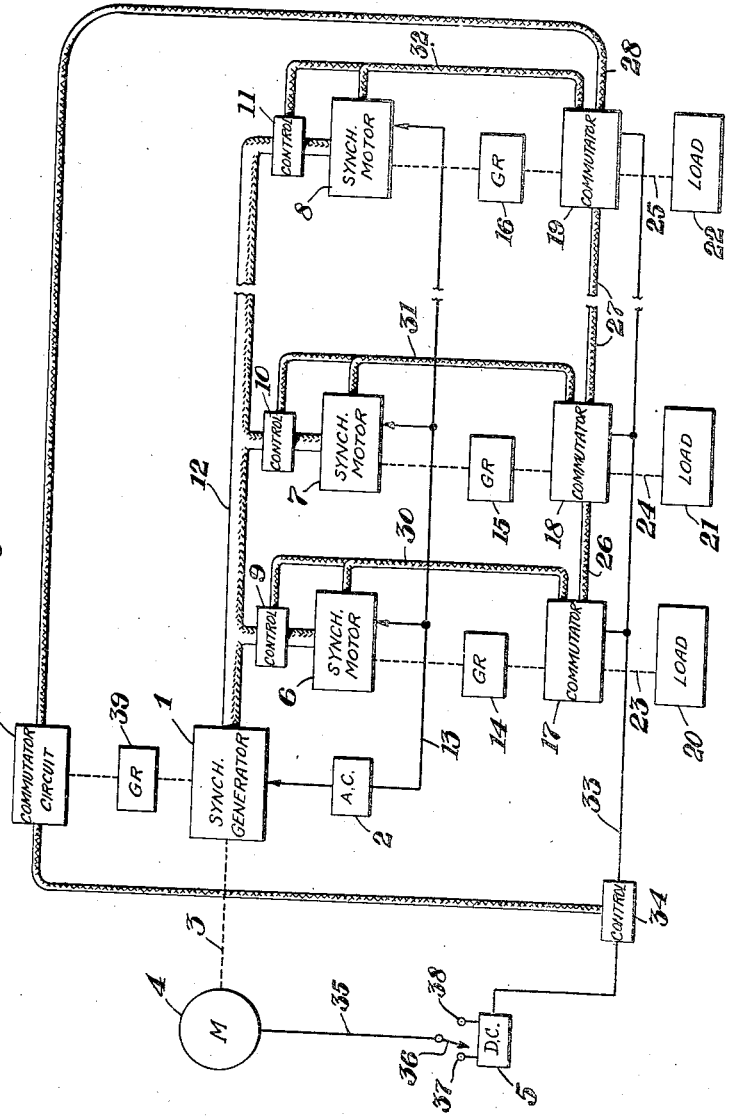
INVENTOR.
FRED C. WALLACE
BY Percy P. Lantz
ATTORNEY

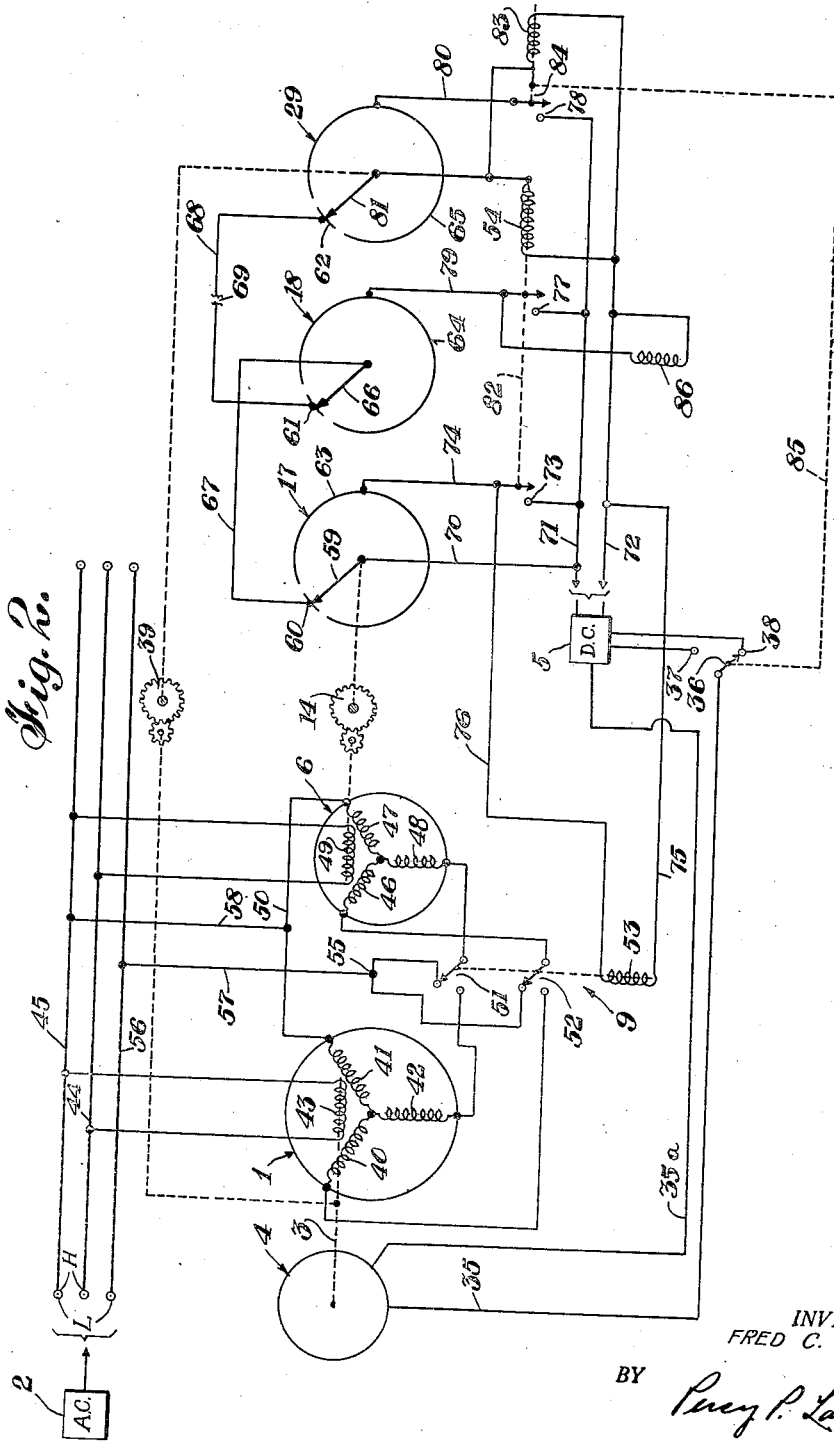

Patented July 6, 1948

2,444,480

UNITED STATES PATENT OFFICE 2,444,480

ELECTRIC MOTOR SYNCHRONIZING SYSTEM

Fred C. Wallace, New York, N. Y., assignor to Federal Telephone and Radio Corporation, New York, N. Y., a corporation of Delaware Application November 21, 1945, Serial No. 630,066

14 Claims. (Cl. 318—19)

This invention relates to method and apparatus for synchronizing the operation of a plurality of rotary equipment and more particularly to an arrangement for remotely controlling the rotary alignment of a plurality of electric motors.

In some applications involved in the use of direction finding systems, it is required to employ a plurality of rotary goniometers as well as means for producing a circular sweep for the oscilloscope indicator. Since the circular sweep in this case is preferably derived from a rotating mechanical source, it is desirable to synchronize the instantaneous rotary positions of the goniometers and that of the oscilloscope sweep source quite accurately before actually operating the system.

It is an object of the present invention to provide an apparatus for synchronizing the rotary positions of a plurality of rotary equipments.

Another object is to provide for the synchronization of rotary equipment by means of remote control.

Still another object is to provide a remote control synchronizing arrangement involving the use of a synchronizing generator and a plurality of self-synchronizing motors driving loads through reduction gearing.

A still further object is to provide automatic means which is effective in aligning a plurality of motors before the operation of the system as a whole is possible.

Still another object is to provide a synchronizing system of the type described which is effective in maintaining aligned a plurality of associated motors.

In accordance with the invention, I provide a synchronizing generator and one self-synchronizing motor for each driven apparatus of the system which is to be synchronized. For many purposes, for example, when a number of goniometers are to be similarly aligned, correction of position within one degree is required. A characteristic of the synchro-motors is that for small displacements the torque is very low. In view of the very low torque for small displacements from the zero position of these synchro-motors, sometimes known as Selsyn and also as follow-up motors, I have used reduction gearing for coupling the motor to their respective loads. This gear reduction serves to increase the torque and also increases the permissible displacement of the motor with respect to the load driven through the gearing so that the tolerance is increased. Thus a multiplied increase in the effective torque results. However, since the use of reduction gearing results in a corresponding increase in the number of points of equilibrium of the loads as far as the motors are concerned, I provide a successive alignment of the motors by means of commutators coupled mechanically to the generator and each of the motors. The commutators, in conjunction with corresponding associated relays act to cause the successive alignment of the motors with the synchronizing generator before the entire system is able to function. Furthermore, since the various loads may have considerable inertia, the system has a provision for starting and lining up the loads at a lower speed than the normal operating speed of the synchro-generator which controls the motors until all of the synchros have been aligned. Upon a complexed alignment of these synchros, full driving voltage is automatically applied to the drive motor to permit it to operate at full normal speed. When the system is viewing normally, an automatic control maintains it in synchronism. The action of the system is such as to cause it to stop and to start over again if one of the units falls out of step by more than a small number of angular degrees.

These and other features and objects of the invention will become more apparent upon consideration of the following detailed description of an embodiment of the invention to be read in connection with the drawings in which:

Fig. 1 is a diagram in block form representing the circuit connections of a system involving a given number of rotating pieces of apparatus which are to be synchronized; and Fig. 2 is a circuit diagram in schematic form representing a portion of the circuit of Fig. 1 illustrating the operation thereof.

Referring now to the drawings, the system comprises a synchronizing generator 1, preferably a multicoil stator generator which is being energized from a source of alternating current 2. The generator 1 is mechanically coupled at 3 to a motor 4 which is supplied from a source of adjustable direct current 5. The system further comprises a series of self-synchronizing motors of which only three, namely, 6, 7 and 8 have been shown which by way of controls 9, 10 and 11 may all be connected in parallel to the respective stator coils of the generator 1 over a strand of cables 12. The motors 6 through 8 are energized in parallel circuits from the alternating current source 2 over a connection 13. The motors are also each mechanically coupled over gear reduction systems 14, 15, 16 to corresponding commutator circuits 17, 18 and 19. Suitable loads 20, 21 and 22 such as goniometers, as mentioned are driven by the extended mechanical drivers 23, 24 and 25. The commutator circuits are connected in series as indicated at 26, 27, and 28, commutator 29 associated with the generator 1 being the last in the series. If desired, a load may be also applied to commutator 29. By means of cables 30, 31, 32 the commutator circuits are also controlling the operation of the associated motors and their respective controls 9, 10 and 11. The controls 9, 10 and 11 are fed in parallel from the source of direct current 5 through the commutator circuits 17, 18 and 19 over connection 33 by way of a control 34 supplied over commutator 29. Connections 35 and 35a are provided from the direct current source 5 to the motor 4. The connection 35 has a contact 36 controlled by the control 34 such as to provide an alternative low and high voltage direct current potential as indicated by suitable taps 37 and 38. A gear reduction 39 is provided between the generator 1 and the associated commutator 29.

In Fig. 2 a portion of the circuit of Fig. 1 has been shown in detail, analogous elements being indicated with the same references including the generator 1 which is shown to have three stator windings 40, 41 and 42 connected in Y formation. The generator 1 also includes a rotor winding 43 which is fed directly from the alternating current source 2 over conductors 44 and 45. The portion of the circuit of Fig. 1 which is shown in Fig. 2 includes the motor 6 and the commutators 17, 18 and 29. The gear reduction contained in the mechanical coupling between the drive of the generator 1 and the associated commutator 29 is indicated at 39. The motor 6, similar to the generator 1, is provided with three stationary Y connected windings 46, 47, and 48 and a rotor winding 49 connected across the alternating current supply lines 44 and 45, the same polarity being observed as for the generator rotor connections. The three stationary windings of the generator 1 are connected to the corresponding stationary windings of the motor 6, directly as by connection 50 in the case of the stator windings 41 and 47, and by means of the control 9 including contacts 51 and 52 which are normally open, in the case of windings 40 and 46 and the windings 42 and 48 respectively. The contacts 51 and 52 are controlled by means of a direct current relay winding 53, the operation of which is again controlled by a second or auxiliary relay 54 as will appear hereinafter. The stator windings 46 and 48 of the motor 6 are connected together at 55 to a low voltage alternating current line 56 over a connection 57 and contacts 51 and 52 normally in the position as shown. The stator windings 41 and 47 are directly connected to the alternating current line 45 over a conductor 58. The rotor of the motor 6 is mechanically coupled through reduction gearing 14 to rotary brush 59 of commutator 17. The commutators 17, 18 and 19 have short conductor segments 60, 61, and 62 and long conductor segments 63, 64 and 65, respectively. The short segment 60 of the commutator 17 is conductively coupled to rotary brush 66 of the commutator 18 by means of a connection 67. The connection from the short segment of a preceding commutator to the brush of the succeeding commutator holds true for all commutators except the last one 29 where a connection 68 conductively couples the short segment of commutator 18 (next to the last commutator) to the short segment 62 of the last commutator 29. For the sake of brevity, and in view of duplications of the connections, additional commutators have not been shown in either Fig. 1 or 2, although, of course, other motors and loads are within the scope of the present invention as indicated by the break 69 between commutators 13 and 29. A conductor 70 connects the rotary brush 59 to one side 71 of the direct current source 5, the other side being indicated at 72, the long segment 63 of the commutator 17 being arranged for connection to the same side 71 of the direct current source 5 over a normally open contact 73 by way of a conductor 74. This contact 73 is controlled by the relay winding 54 as will appear in detail presently.

The relay winding 53 is connected on one side 75 thereof to the line 72 of the direct current source 5, the other side 76 being arranged for connection to the direct current line 71 over the contact 73. The long segments 64 and 65 of the commutators shown, as well as those of possible additional commutators not shown, are similarly connected to the direct current line 71 over open contacts as at 77 and 78 and connections 79 and 80 respectively.

The commutator 29 is equipped with a rotary brush 81 which is connected to one side 72 of the direct current source 5 in series with relay winding 54. This winding 54, as indicated, controls the operation of the contacts 73 and 77, the unitary operation of the relay and the contacts being suggested by the broken line 82. The contact 78 which connects the long segment 65 to the direct current line 71 is controlled by a relay winding 83 which forms part of the control 34 and which is connected in parallel circuit with the winding 54. The winding 83 operates its associated contacts 78 as indicated by the broken line 84, as well as contact 36 by means of a mechanical connection indicated at 85, which contact controls the D. C. potential applied to the motor 4 and thereby its speed. The connections for the other motors associated with the various commutators and the corresponding relays controlling the connections between the respective motor and generator stator windings are as shown for motor 6 and the relay 51. The motor circuit 7 which is associated with the commutator 18 includes a relay indicated at 86 which is connected to one end of the open contact 77 and on the other side to the direct current line 72 similar to the connection of the winding 53. The contacts, controlled by the winding 86 and associated with the connections of the corresponding stator windings, have not been shown since these as well as the relays and contacts associated with the other motors are identical with those shown for the relay winding 53.

In operation, the application of the alternating current and the direct current, which latter may be obtained over rectifiers from the alternating current source, delivers A. C. power to the motors 6, 7 and 8 and direct current to the motor 4 to effect the rotation thereof, initially at slow speed, since the relay 83 is unoperated and contact 36 is in the low voltage position 38. It is to be noted here that since the loads have comparatively considerable inertia, that their line-up takes place at a lower speed than the normal operating speed of the synchronizing generator which controls the various motors. Accordingly, the drive motor is first driven at a relatively slow speed until all the motors have been aligned. The sequence of alignment of the motors starts with motor 6. Direct current voltage is applied to the brush 59 of the commutator 17 associated with the motor 6. If the initial position of the motor 6 is such that the brush makes contact with the long commutator segment 63, the relay winding 53 will be energized, the open contact 73 being effectively short-circuited by the brush 59 and the segment 63. The actuation of the relay 53 will effect the movement of the contacts 51 and 52 which will connect the motor stator windings 46 and 48 to the corresponding windings of the generator 1 changing from their initial connection to the low potential line 56. Since the generator 1 is operating from the shaft of a direct current motor 4, it will supply stator voltages to the motor 6 causing it to rotate until the brush 59 makes contact with the segment 60. This causes the winding 53 to become de-energized and the return of relay contacts 51 and 52 to normal to connect the stator windings 46 and 48 to the low potential line 56 of the alternating current supply over the connection 57. Since the stator winding 47 is connected to the common line 45 of the alternating current line, current will flow in the three stator windings of the motor setting up a magnetic field in the plane of the winding 47; because the components of the fields set up outside that plane by the current in windings 46 and 47 are equal and opposite, therefore, cancelling out and leaving only components in the plane of the winding 47. The rotor 49 acting as an electromagnet aligns itself with the field set up by the stator windings. This last action would also occur if the original position of the motor had been such that the commutator brush was on the small commutator segment 60. After the rotor 49 has become aligned, the commutator brush 59 making contact with the center of the short segment 60 applies direct current to the commutator 18 over the brush 66 which causes the motor 7, for instance (Fig. 1), to become aligned in the same manner by which the motor 6 was aligned to a central position. The relay 86 is associated with motor 7 similar to the relation between motor 6 and relay 53. When the motor 7, associated with the commutator 17 has become aligned, it will cause the rotors of any further motors to line up progressively in a central position. When the brush 81 of the commutator 29 makes contact with the short segment 62 after the preceding motor has become aligned, relay windings 54 and 83 will be energized by the voltage applied through the brush 81 of the commutator 29 associated with the generator 1. Energization of the windings 54 and 83 will cause the closing of contacts 73 and 77, and 78, and the operation of contact 36 respectively whereby a direct current voltage is applied to relays 53 and 86 of the two motors shown and to the other relays of the motors indicated in Fig. 1 and a normal, comparatively high D. C. potential to the drive motor 4. This will cause the completion of the stator coil circuits between the individual motors and the generator. The motors will thus start turning over from a pre-aligned position and at normal full speed. As the brush on the master commutator 29 makes contact with the long segment 65, relays 54 and 83 remain energized due to the make-before-break action of the brush which keeps the direct current voltage on the windings 54 and 83 through the contact 78. The system will continue to operate as long as the commutators 17, 18, 29 remain synchronized over the portion of travel for the small segment. If they fall out of line, the contacts controlled by the windings 54 and 83 will open and the system will stop until they line up again, when it will start again. To insure proper synchronization, it is necessary to accurately align the mechanical zero of the commutators with the electrical zero of the motors and of the generator.

It has already been mentioned that the self-synchronizing motor has a very low torque for small displacements from their zero position. Therefore, since adjustment to within 1° is called for, a reduction gearing between the motors and their loads and commutators of 10:1 was used. In view of the 10:1 reduction, a greater departure from zero is permitted in the motors when increasing the effective torque by 10, which increase is again multiplied by 10 because of the reduction gearing. Because of this reduction, it is necessary to synchronize in position since otherwise the loads would have 10 points of equilibrium in respect to the motors. For this reason, the commutator arrangement together with the successive alignment of the various motors has been provided. A considerable inertia in the loads is therefore permissible.

It will be seen from the above that I have provided an effective method and means for causing the alignment of a number of loaded motors in the same initial position as the governing generator before the entire system functions and which causes the system to stop and start over again as a consequence of the relative deviation of one of the units from the others by a very small number of angular degrees in spite of considerable inertia of the loads.

While I have described above the principles of my invention in connection with specific apparatus, it is to be clearly understood that this description is made only by way of example and not as a limitation on the scope of my invention as defined in the objects and the accompanying claims.

I claim:

1. A system for aligning a plurality of rotary loads, comprising a synchronizing generator, means for driving said generator at a given speed, a self-synchronizing motor coupled to the output of said generator for driving each rotary load, a reduction gearing means intermediate each motor and load, commutator means coupled for rotation with each load, means in circuit with said commutator means for successively aligning said loads, and means responsive to said alignment for increasing said given speed.

2. A system for synchronizing the operation of a plurality of rotary equipments, comprising a synchronizing generator, a plurality of self-synchronizing motors for driving the rotary equipments operatively connected with said generator for following the rotary position thereof, means for operatively controlling the connections between said generator and each of said motors, respective commutator means rotatively driven in synchronism with said generator and with each of said rotary equipments, each of said commutator means associated with said motors controlling the operation of said corresponding means-for-controlling the said connections and the operation of a succeeding commutator and its associated means for controlling the said connections to effect the alignment of said motors with said generator, and commutator means associated with said generator to control the operation of said generator to further the operation of said means-for-controlling the connections after said motors have been aligned.

3. A system according to claim 2 wherein said generator and said motors each have three stator windings and said means for controlling the connections comprises a relay for operating contact switches in the circuit connecting two corresponding stator windings of said generator and each motor.

4. A system according to claim 2, wherein each said commutator means comprises a rotary brush, a short and a long segment, said short segment being connected to the brush of the succeeding commutator associated with a motor and said long segment being connected with said corresponding means for controlling said connections.

5. The system according to claim 2 further including second means for controlling the operation of said first means-for-controlling the said connections in circuit with said commutator means.

6. A system according to claim 2 further including second means for controlling the operation of said first means-for-controlling the operation of the said connections in circuit with said commutator means, wherein said commutator means comprises a rotary brush, a short and a long segment, said short segment being connected to the brush of the succeeding commutator associated with a motor, and said long segment being connected with said corresponding means-for-controlling the said connections, and switch means controlled by said second means-for-controlling the operation.

7. A system according to claim 2 further including second means for controlling the operation of said first means-for-controlling the said connections in circuit said commutator means, said second controlling means being in circuit with said commutator associated with said generator.

8. A system according to claim 2 further including gear reduction means between each motor and its respective equipments and between the generator and its associated commutator means.

9. A system according to claim 2 further including a drive motor for driving said generator and means associated with said last named commutator means for controlling the speed of said drive motor.

10. A system for synchronizing the operating position of a plurality of self-synchronizing motors, comprising a synchronizing generator, separate commutator means driven by each of said motors, connection controlling means between each motor and said generator coupled to each of said commutator means to effect an opening of said connections upon alignment of each motor with said generator, and commutator means driven in timed relation with said generator to complete a circuit for effectively closing said connection controlling means in response to alignment of all said first named commutator means.

11. A system according to claim 10 wherein said generator and said motors each comprise three stator windings, two windings of each motor normally being connected in parallel to be energized from one side of an alternating current source and the remaining winding being connected to be energized from the other side of said alternating current source, said connection controlling means being arranged to effect a connection of the three corresponding generator and motor windings prior to the alignment of each motor with said generator.

12. A system according to claim 10 wherein said circuit completed by the said commutator means associated with the generator includes at least one relay for completing an energizing circuit for closing connection controlling means.

13. A system for synchronizing the operating position of a plurality of loads each driven by an associated self-synchronizing motor, comprising a synchronizing generator, separate commutator means driven in synchronism with each of said loads, gear reduction means intermediate each motor and load, connection controlling means between each motor and said generator coupled to each of said commutator means to effect an opening of said connections upon alignment of each motor with said generator, and commutator means driven in timed relation with said generator to complete a circuit for effectively closing said connection controlling means in response to alignment of all said first named commutator means.

14. A system for synchronizing the operating position of a plurality of loads each driven by an associated self-synchronizing motor, comprising a synchronizing generator, a drive motor for said generator, separate commutator means driven in synchronism with each of said loads, gear reduction means intermediate each motor and load, connection controlling means between each motor and said generator coupled to each of said commutator means to effect an opening of said connections upon alignment of each motor with said generator, commutator means driven in timed relation with said generator to complete a circuit for effectively closing said connection controlling means in response to alignment of all said first named commutator means and means for increasing the speed of said drive motor in response to said alignment.

FRED C. WALLACE.

REFERENCES CITED

The following references are of record in the file of this patent:

UNITED STATES PATENTS

| Number | Name | Date |
| --- | --- | --- |
| 1,561,265 | Menzies | Nov. 10, 1925 |
| 2,406,853 | Richardson et al. | Sept. 3, 1946 |